United States Patent
Headley et al.

(10) Patent No.: US 8,944,418 B2
(45) Date of Patent: Feb. 3, 2015

(54) USE OF DOWNCOMER BEAM TO SUPPORT ADJACENT CROSS FLOW TRAYS WITHIN A MASS TRANSFER COLUMN AND PROCESS INVOLVING SAME

(75) Inventors: Darran Matthew Headley, Valley Center, KS (US); David R. Ewy, Goddard, KS (US); Gary W. Gage, Grand Prairie, TX (US)

(73) Assignee: Koch-Glitsch, LP, Wichita, KS (US)

( * ) Notice: Subject to any disclaimer, the term of this patent is extended or adjusted under 35 U.S.C. 154(b) by 462 days.

(21) Appl. No.: 13/470,498

(22) Filed: May 14, 2012

(65) Prior Publication Data
US 2012/0292791 A1 Nov. 22, 2012

Related U.S. Application Data

(60) Provisional application No. 61/486,645, filed on May 16, 2011.

(51) Int. Cl.
*B01F 3/04* (2006.01)
*B01D 3/32* (2006.01)
*B01D 3/22* (2006.01)

(52) U.S. Cl.
CPC . *B01D 3/32* (2013.01); *B01D 3/225* (2013.01)
USPC .................................. 261/114.1; 261/114.5

(58) Field of Classification Search
USPC ........... 261/114.1, 114.2, 114.3, 114.4, 114.5
See application file for complete search history.

(56) References Cited

U.S. PATENT DOCUMENTS

| | | | | |
|---|---|---|---|---|
| 3,045,989 | A | * | 7/1962 | Kittel ........................ 261/114.3 |
| 3,573,172 | A | * | 3/1971 | Streuber ...................... 202/158 |
| 4,208,360 | A | * | 6/1980 | Belyakov et al. .......... 261/114.1 |
| 4,547,326 | A | * | 10/1985 | Weiler ....................... 261/114.1 |
| 6,736,378 | B2 | | 5/2004 | Colic et al. |
| 2003/0067085 | A1 | | 4/2003 | Shakur et al. |
| 2004/0026801 | A1 | * | 2/2004 | Konijn et al. .............. 261/114.1 |
| 2004/0036186 | A1 | | 2/2004 | Lee et al. |
| 2004/0080059 | A1 | | 4/2004 | Weiland et al. |
| 2005/0218534 | A1 | | 10/2005 | Colic et al. |
| 2007/0145612 | A1 | * | 6/2007 | Konijn et al. .............. 261/114.5 |
| 2009/0189301 | A1 | | 7/2009 | Lee et al. |
| 2010/0244290 | A1 | * | 9/2010 | Xu ............................. 261/114.1 |
| 2013/0234348 | A1 | * | 9/2013 | Nieuwoudt et al. ....... 261/114.5 |

OTHER PUBLICATIONS

Notification of Transmittal of the International Search Report and the Written Opinion of the International Searching Authority, or the Declaration; Date of Mailing: Dec. 3, 2012; International Application No.: PCT/US2012/037924; International Filing Date: May 12, 2012; Applicant: Koch-Glitsch, LP.

* cited by examiner

*Primary Examiner* — Charles Bushey
(74) *Attorney, Agent, or Firm* — Hovey Williams LLP

(57) ABSTRACT

Cross flow trays in a mass transfer column are provided with downcomers having one or more walls that extend from a tray deck of one the cross flow trays to an elevation below a tray deck of an underlying one of the cross flow trays. The downcomer walls are connected to and provide structural support for the tray decks of the cross flow trays.

20 Claims, 15 Drawing Sheets

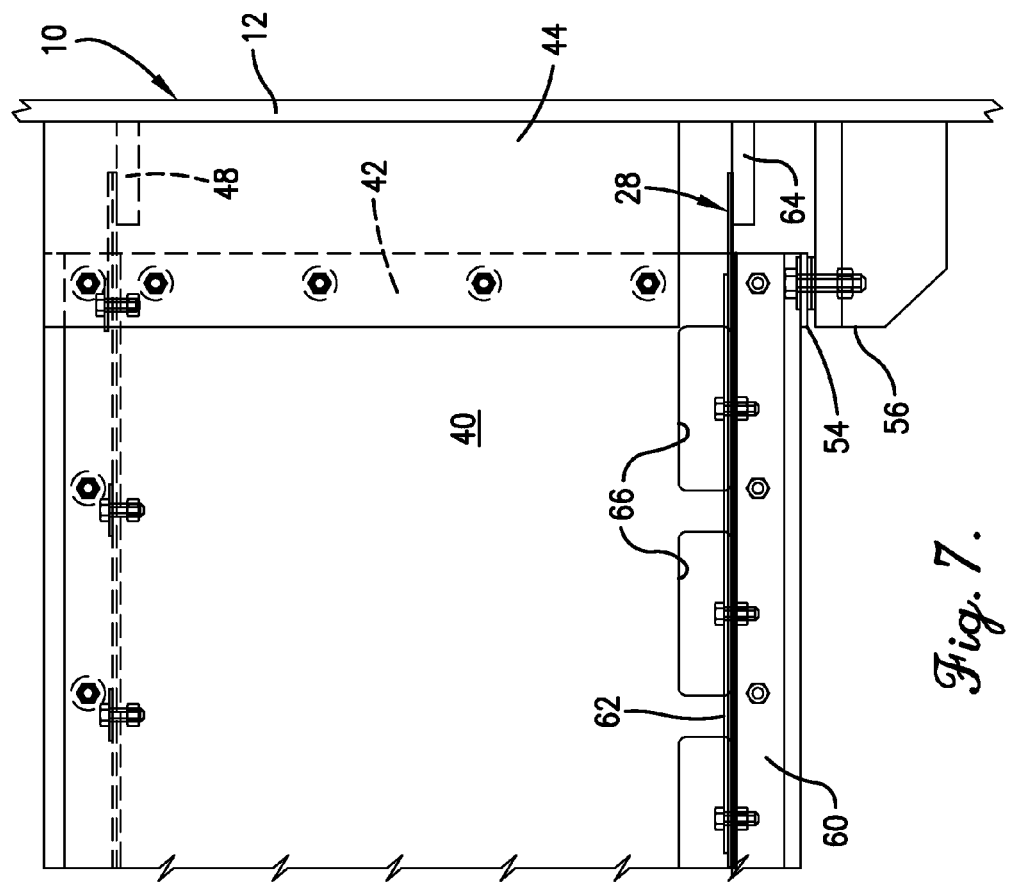
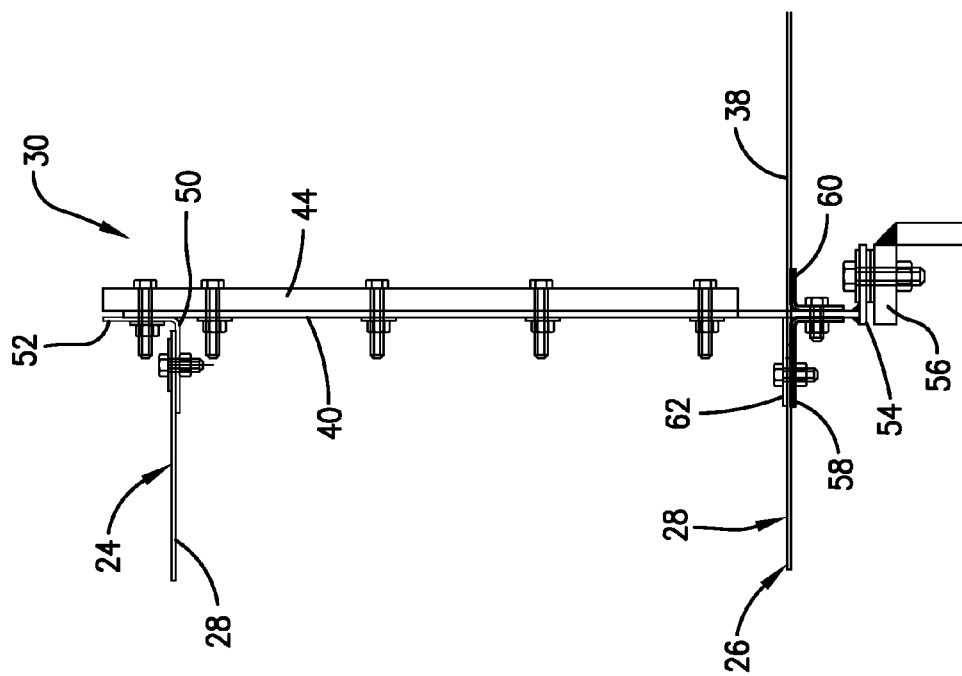

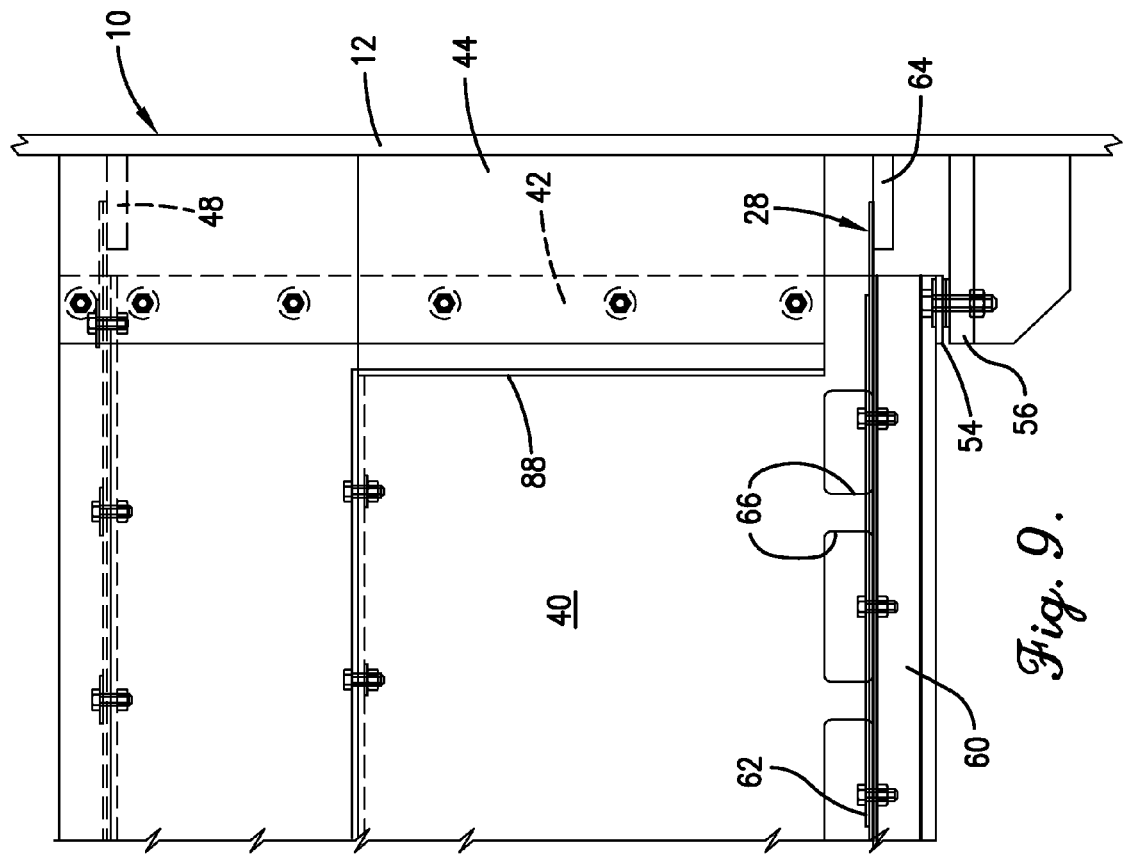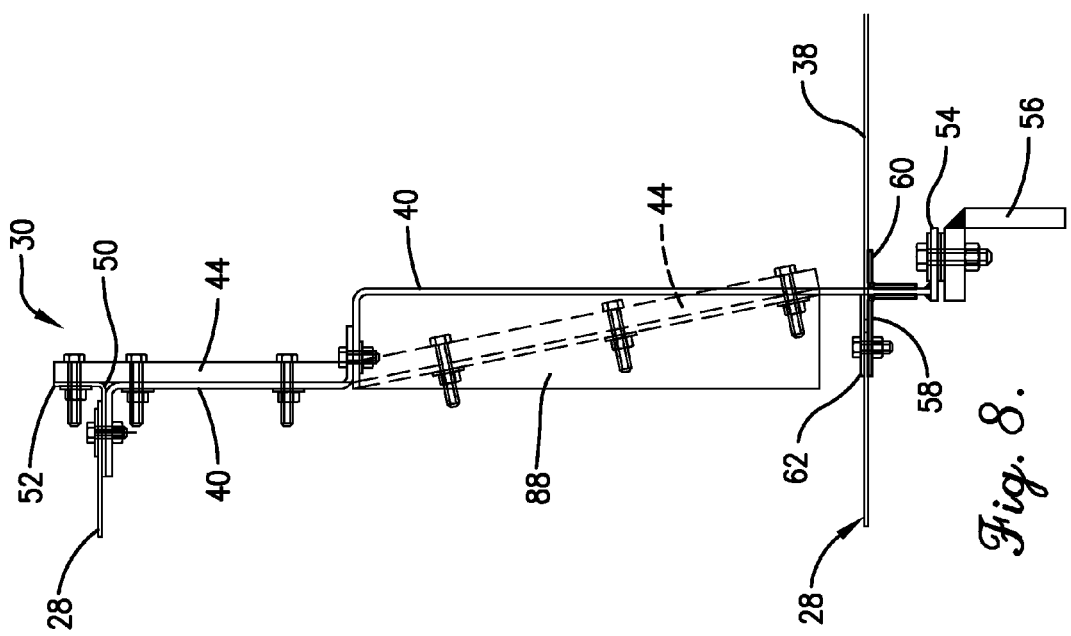

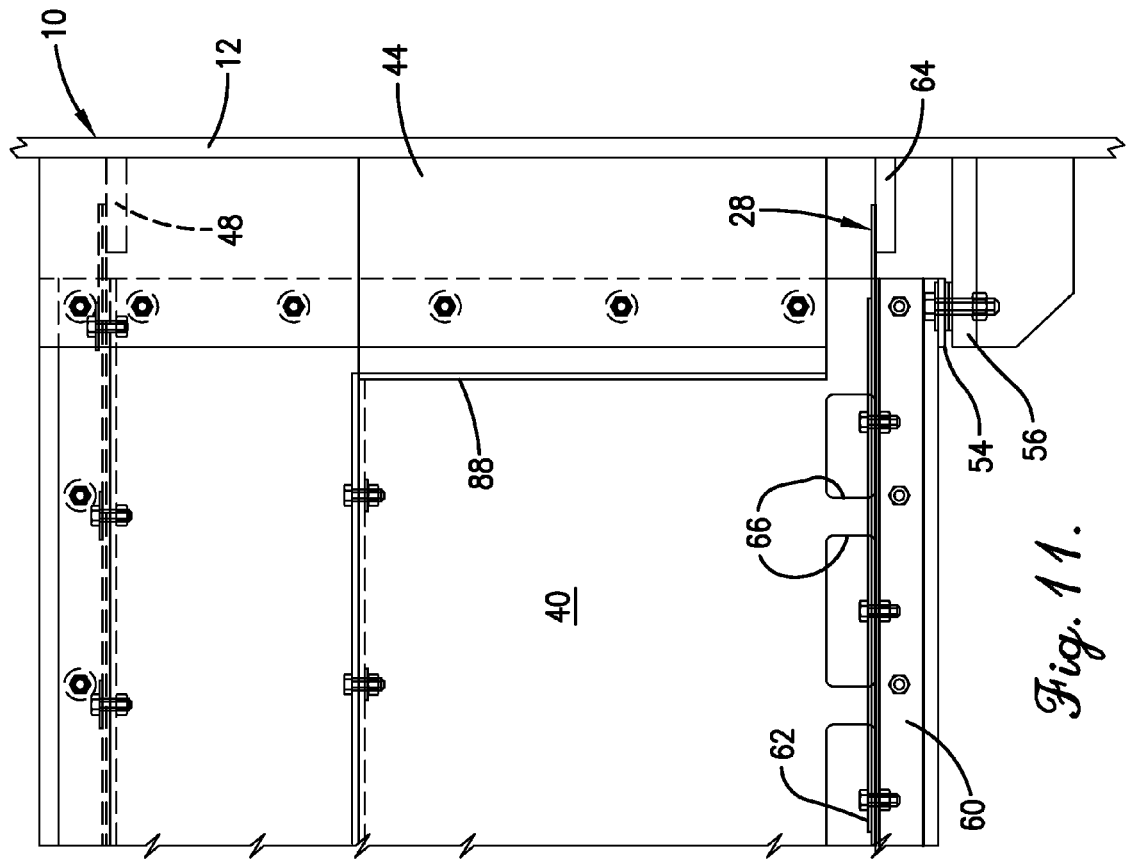
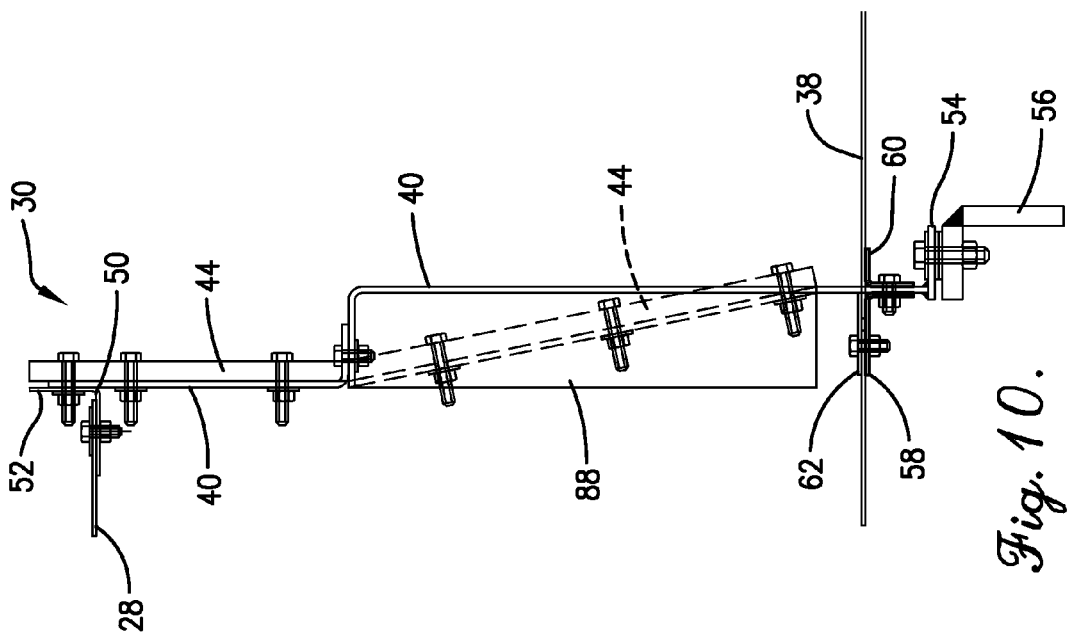

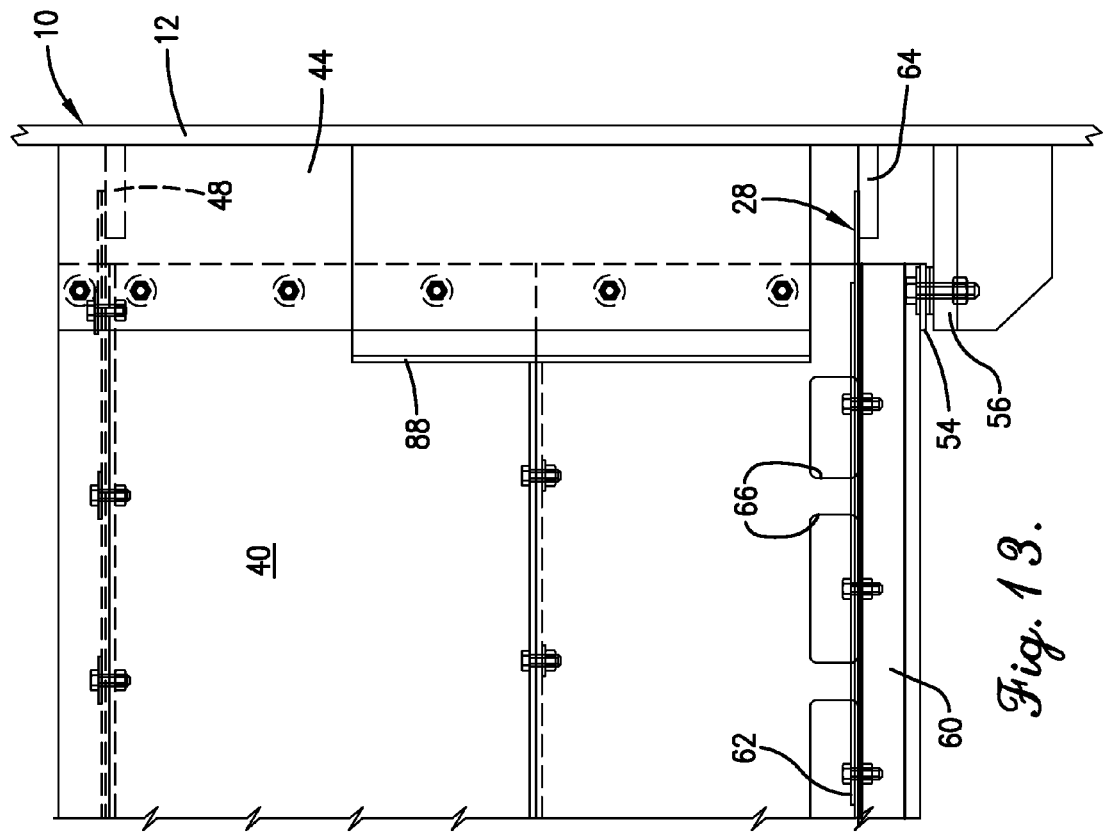
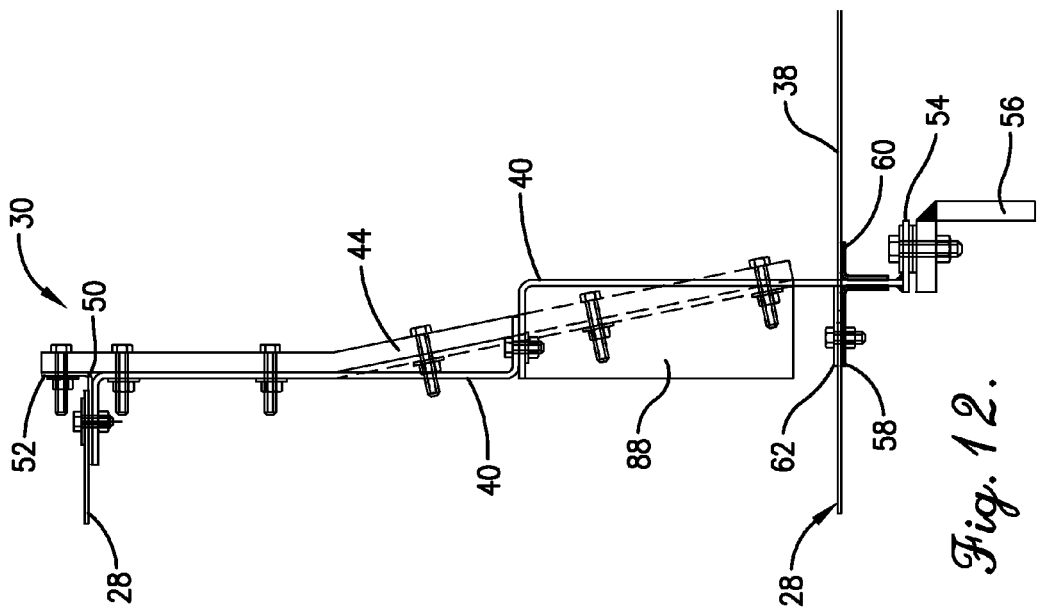

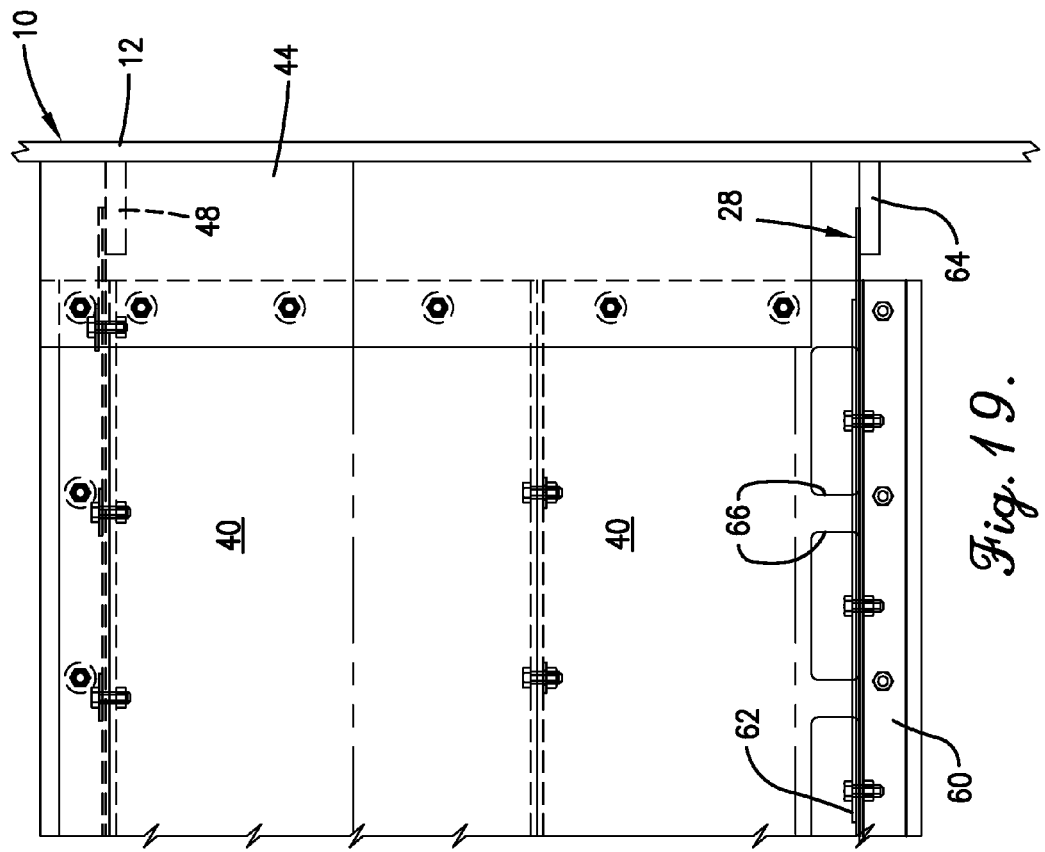
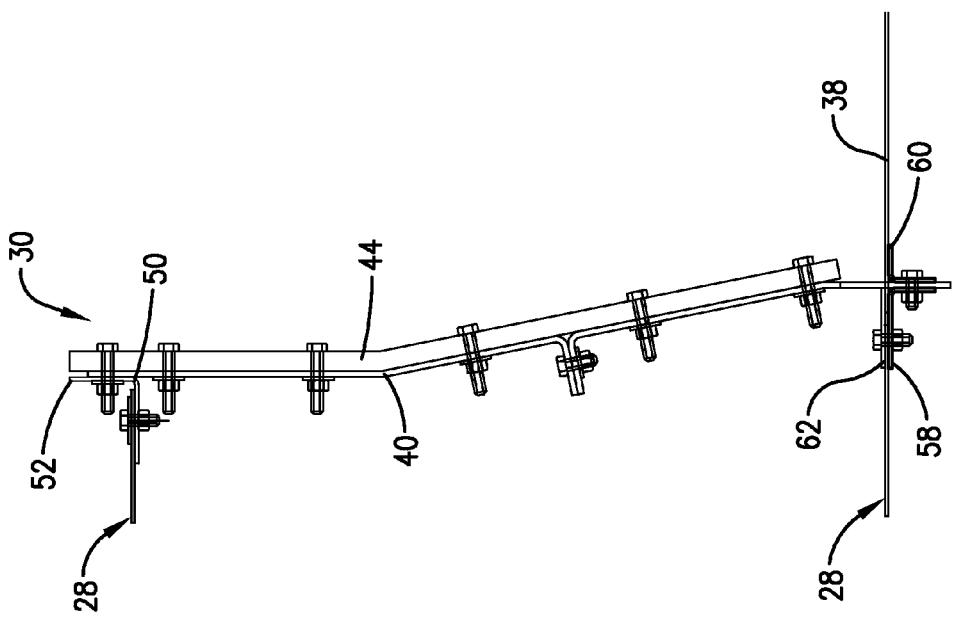

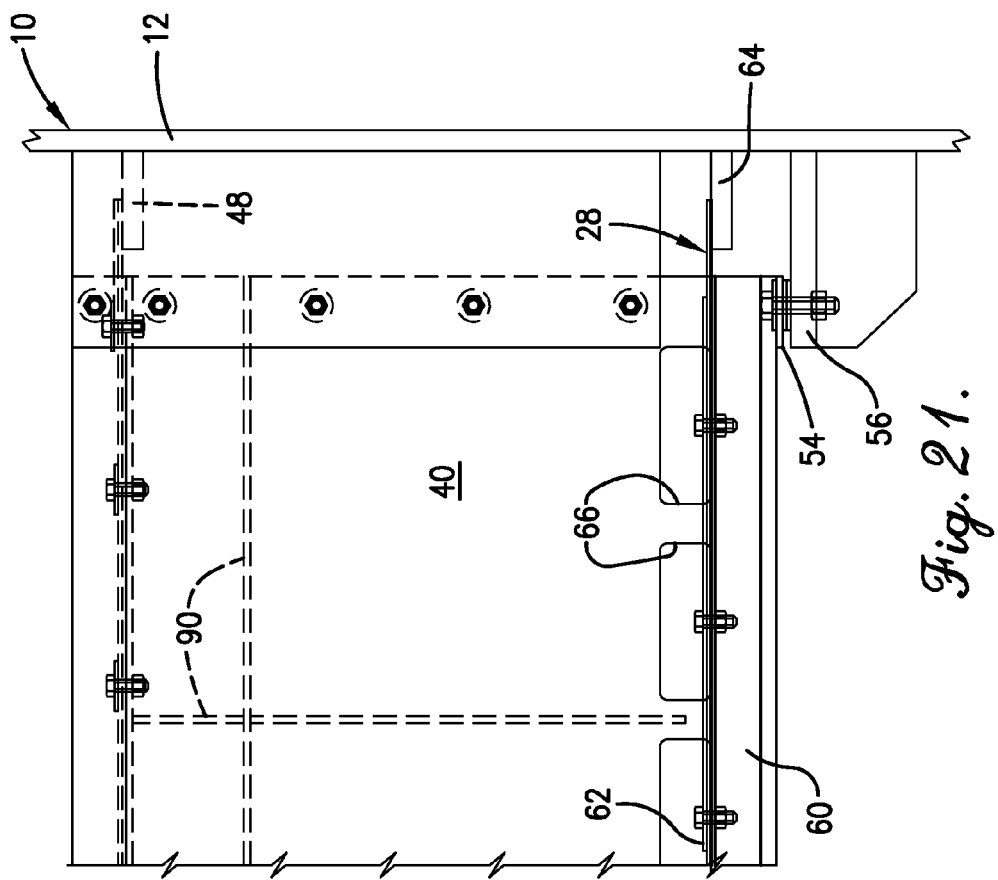
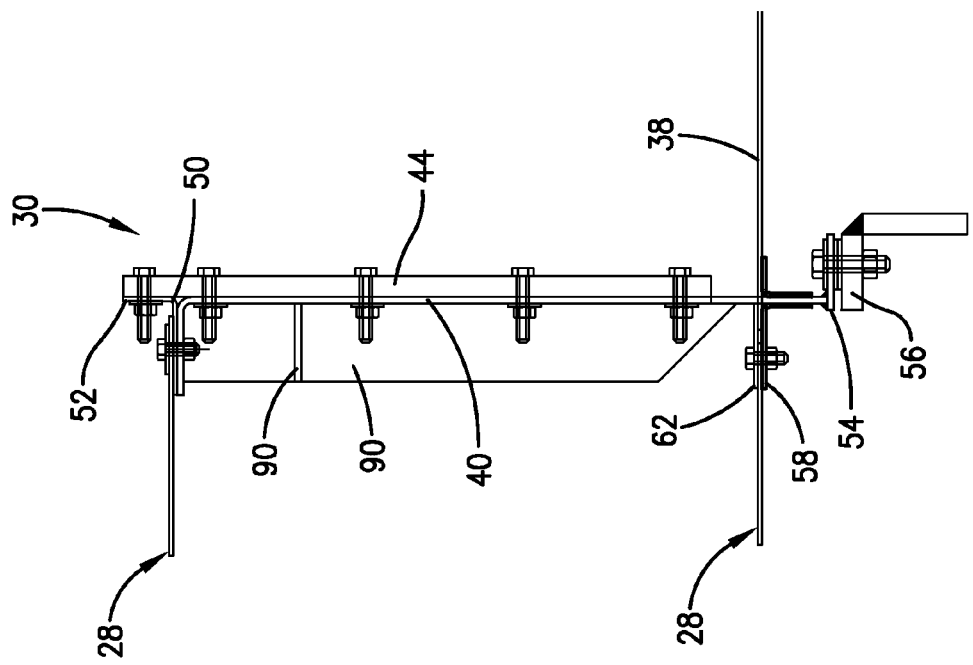

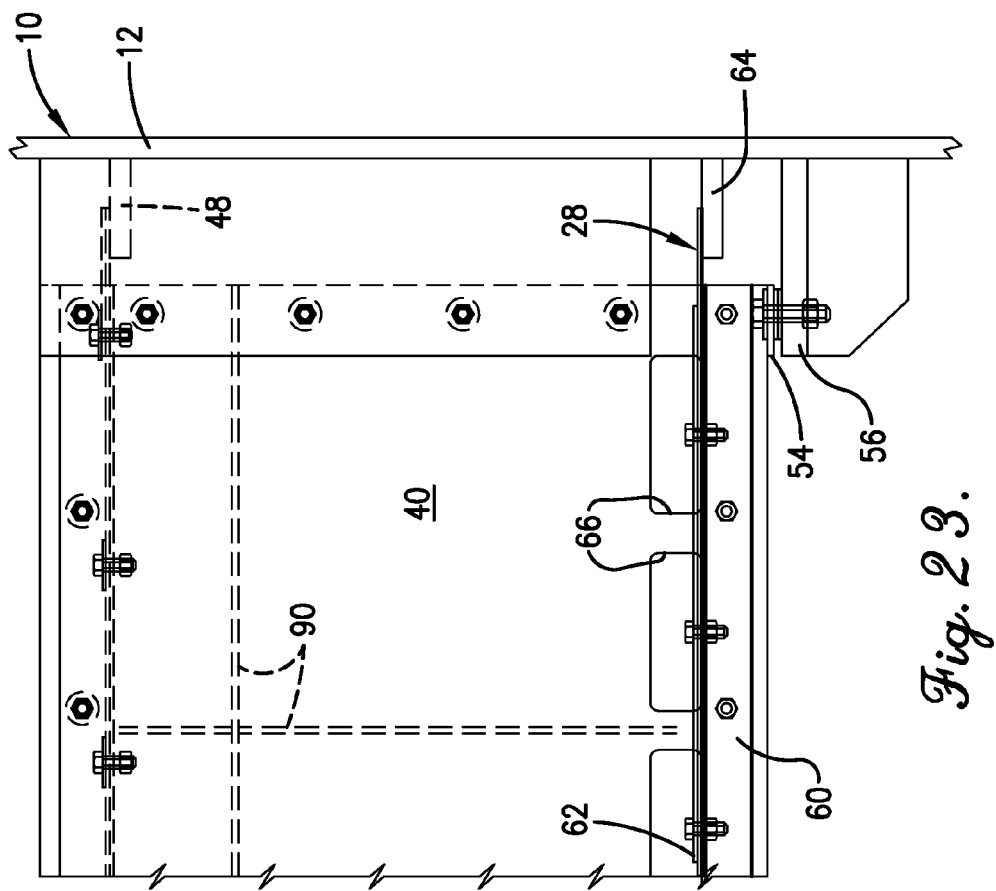
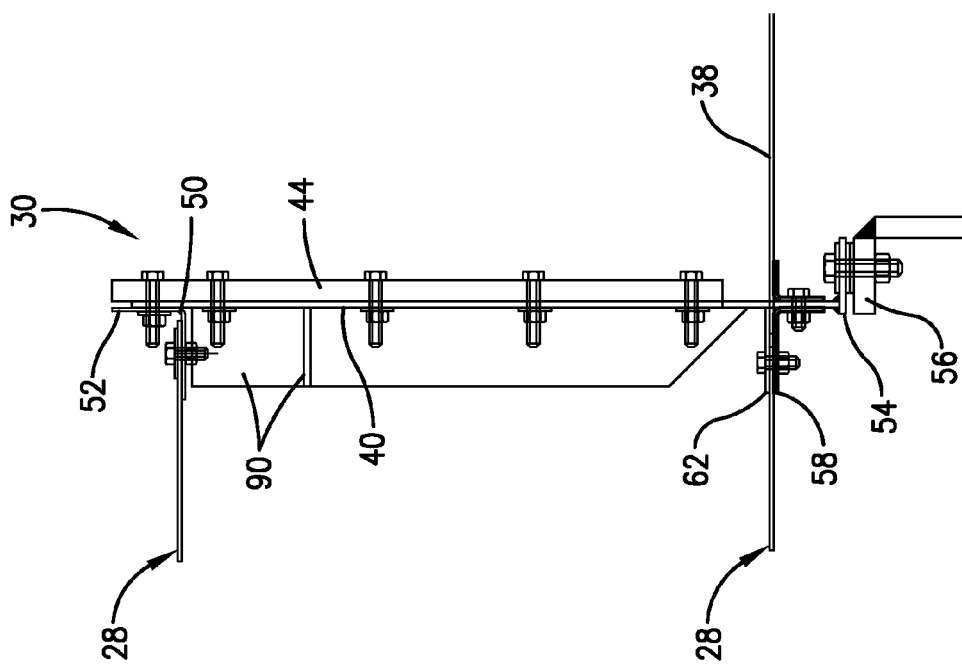

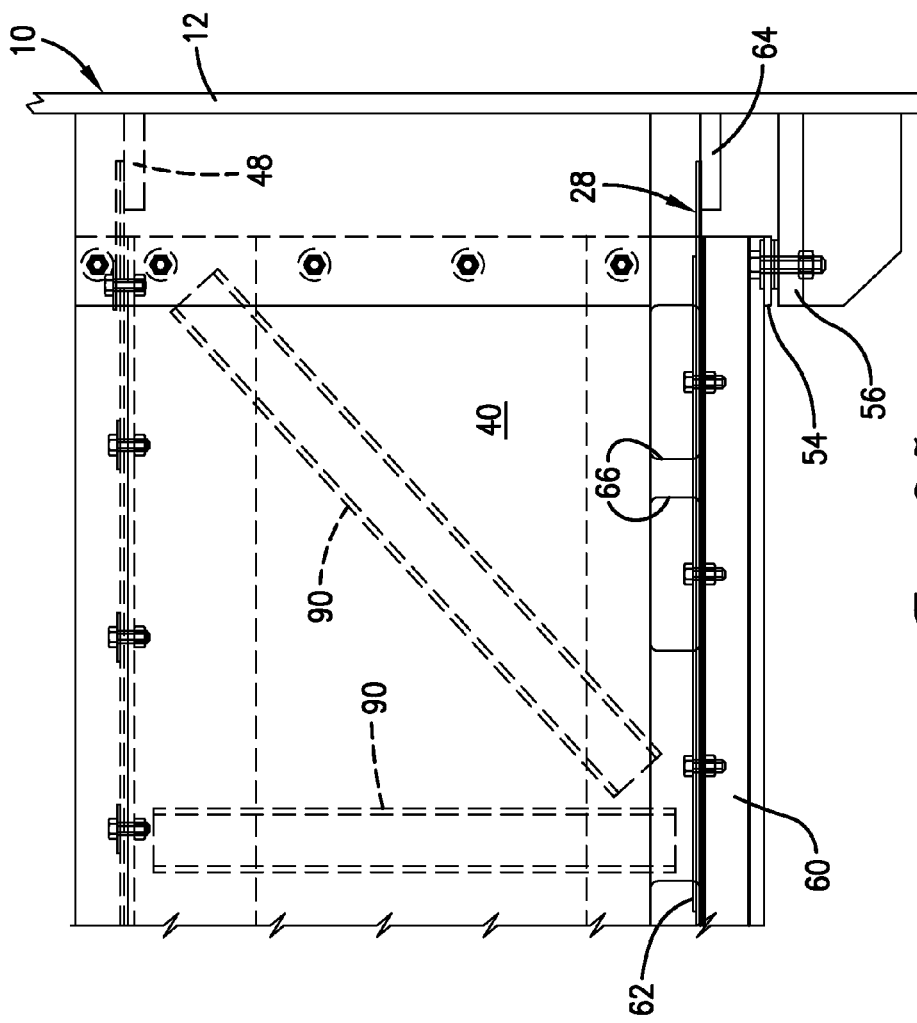
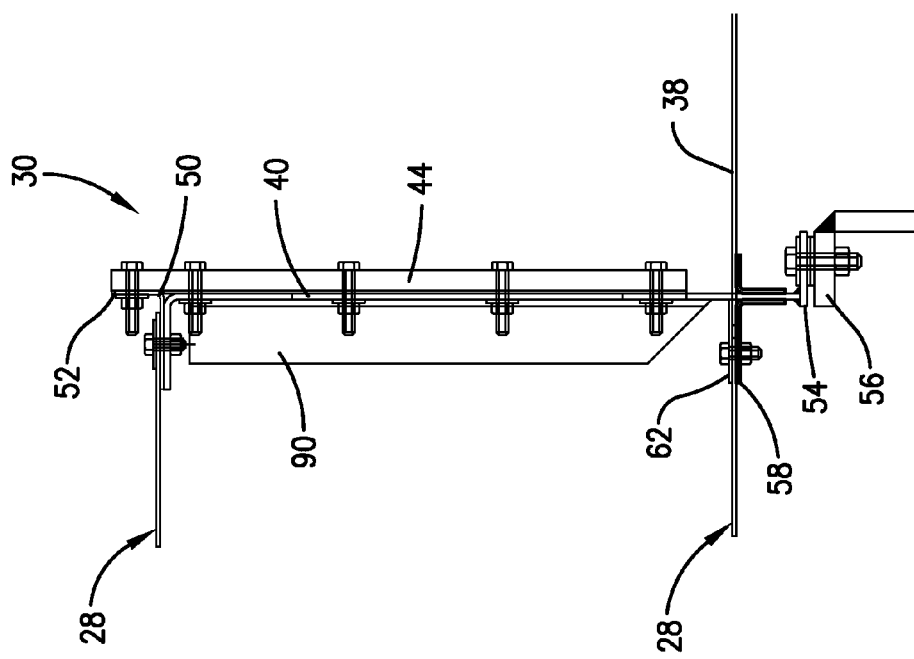

US 8,944,418 B2

USE OF DOWNCOMER BEAM TO SUPPORT ADJACENT CROSS FLOW TRAYS WITHIN A MASS TRANSFER COLUMN AND PROCESS INVOLVING SAME

BACKGROUND OF THE INVENTION

The present invention relates generally to apparatus and methods for supporting vapor-liquid or liquid-liquid cross flow trays within mass transfer columns in which mass transfer and/or heat exchange processes occur and, more particularly, to apparatus and methods for using one such cross flow tray to support an adjacent cross flow tray.

Cross flow trays are used within mass transfer columns to facilitate interaction between fluid streams flowing in countercurrent relationship within the column. The term mass transfer column as used herein is not intended to be limited to columns in which mass transfer is the primary objective of the processing of the fluid streams within the column, but is also intended to encompass columns in which heat transfer rather than mass transfer is the primary objective of the processing. The fluid streams are typically an ascending vapor stream and a descending liquid stream, in which case the cross flow trays are commonly referred to as vapor-liquid cross flow trays. In some applications, both fluid streams are liquid streams and the cross flow trays are commonly referred to as liquid-liquid cross flow trays. In still other applications, the ascending fluid stream is a gas stream and the descending fluid steam is a liquid stream, in which case the cross flow trays are referred to as gas-liquid cross flow trays.

The cross flow trays each have a planar tray deck on and above which interaction between the ascending fluid stream and the descending fluid stream occurs, a plurality of apertures to allow upward passage of the ascending fluid stream through the tray deck and into the descending fluid stream to create a froth or mixture in which the desired mass transfer and/or heat exchange occurs, and at least one downcomer that directs the descending fluid stream from the associated tray deck to a tray deck on an underlying cross flow tray. The cross flow trays are positioned within the column in vertically spaced-apart relationship with each of the tray decks extending horizontally to fill the entire internal cross-section of the column.

A cross flow tray having a single side downcomer located at one end of the tray deck is known as a single-pass tray. In other applications, typically those involving higher descending liquid flow rates, multiple downcomers may be used on some or all of the contact trays. For example, in two-pass configurations, two side downcomers are positioned at opposite ends of one cross flow tray and a single center downcomer is positioned in the center of the underlying cross flow tray. In four-pass configurations, one contact tray has two side downcomers and a center downcomer and the underlying contact tray has two off-center downcomers.

The tray decks of cross flow trays are typically secured by clamps to support rings welded to the interior surface of the column shell. The downcomer walls are also normally bolted at their opposite ends to bolting bars that are also welded to the interior surface of the column shell. In some applications, such as in larger diameter columns and in columns in which vibratory forces are a concern, it is known to add further support to portions of the tray deck by using major beams, lattice trusses or a system of hangers to connect the tray deck of a cross-flow tray to the downcomer walls of a similar tray located directly above, or below. When hangers are utilized, the downcomer walls act as beams to carry a portion of the load of the coupled tray, thereby reducing sagging and bracing against uplift of the tray deck. These hangers and other structures, however, add complexity to the design and increase the cost of fabrication and installation of the cross flow tray. A need has thus arisen for a method of supporting and bracing the tray deck while reducing the disadvantages resulting from the conventional use of hangers and other structures.

SUMMARY OF THE INVENTION

In one aspect, the present invention is directed to an upper cross flow tray paired with a lower cross flow tray for facilitating interaction between fluid streams in a mass transfer column. The upper and lower cross flow trays each have a tray deck with apertures and a downcomer. At least one, or all, of the downcomers comprise a wall extending downwardly from a tray deck of one of the upper and lower cross flow trays to below the tray deck of the other one of the upper and lower cross flow trays. The wall of the downcomer is connected to and provides structural support for both of the tray decks. In one embodiment, support angles extend along the upper and lower margins of the wall to provide horizontal surfaces to which a chordal edge of the tray decks are bolted or otherwise secured. An inlet panel is positioned to close the bottom of the downcomer and discharge openings are provided in the wall of the downcomer at a location above the tray deck of the other one of the upper and lower cross flow trays so that liquid is discharged from the downcomer, through the discharge openings, and onto the tray deck. The inlet panel is also secured to or coupled with the wall of the downcomer. In one embodiment, the downcomer is a center or off-center downcomer having two of the walls positioned in spaced-apart and parallel-extending relationship. In another embodiment, the downcomer is a side downcomer having only one of the walls.

In another aspect, the present invention is directed to a mass transfer column in which the upper and lower cross flow trays described above are positioned in horizontally-extending and vertically spaced-apart relationship.

In a further aspect, the present invention is directed to a method of supporting the tray decks of the cross flow trays described above in a mass transfer column using the downcomer positioned on one or more, or all, of the upper and lower cross flow trays. The method comprises the steps of securing an upper margin of the wall of the downcomer to the tray deck of one of the cross flow trays along all or substantially all of the chordal length of the wall of the downcomer and securing a lower margin of the wall of the downcomer to the tray deck of an underlying one of the cross flow trays along all or substantially all of the chordal length of the wall. The method also includes the steps of supporting a perimeter portion of the tray decks on circumferential support rings secured to an inner surface of a shell of the mass transfer column and supporting opposite ends of the wall of the downcomer on bolting bars fixed to the inner surface of the shell.

BRIEF DESCRIPTION OF THE DRAWINGS

FIG. 6 is a fragmentary side elevation view of the pair of cross flow trays showing the manner in which one of the downcomer walls supports both the upper and lower cross flow trays;

FIG. 7 is a fragmentary front elevation view of the pair of upper and lower cross flow trays rotated 90 degrees from the view shown in FIG. 6 and showing the manner in which the cross flow trays are supported on the column shell;

FIG. 8 is a fragmentary side elevation view similar to the view shown in FIG. 6, but showing a second embodiment of the downcomer wall;

FIG. 9 is a fragmentary front elevation view of the pair of cross flow trays from FIG. 8, but rotated 90 degrees from the view shown in FIG. 8

FIG. 10 is a fragmentary side elevation view similar to the view shown in FIG. 6, but showing a third embodiment of the downcomer wall;

FIG. 11 is a fragmentary front elevation view of the pair of cross flow trays from FIG. 10, but rotated 90 degrees from the view shown in FIG. 10;

FIG. 12 is a fragmentary side elevation view similar to the view shown in FIG. 6, but showing a fourth embodiment of the downcomer wall;

FIG. 13 is a fragmentary front elevation view of the pair of cross flow trays from FIG. 12, but rotated 90 degrees from the view shown in FIG. 12;

FIG. 18 is a fragmentary side elevation view similar to the view shown in FIG. 6, but showing a seventh embodiment of the downcomer wall;

FIG. 19 is a fragmentary front elevation view of the pair of cross flow trays from FIG. 18, but rotated 90 degrees from the view shown in FIG. 18;

FIG. 20 is a fragmentary side elevation view similar to the view shown in FIG. 6, but showing an eighth embodiment of the downcomer wall;

FIG. 21 is a fragmentary front elevation view of the pair of cross flow trays from FIG. 20, but rotated 90 degrees from the view shown in FIG. 20;

FIG. 22 is a fragmentary side elevation view similar to the view shown in FIG. 6, but showing a ninth embodiment of the downcomer wall;

FIG. 23 is a fragmentary front elevation view of the pair of cross flow trays from FIG. 22, but rotated 90 degrees from the view shown in FIG. 22;

FIG. 24 is a fragmentary side elevation view similar to the view shown in FIG. 6, but showing a tenth embodiment of the downcomer wall; and FIG. 25 is a fragmentary front elevation view of the pair of cross flow trays from FIG. 24, but rotated 90 degrees from the view shown in FIG. 24.

DETAILED DESCRIPTION

Figure 1:
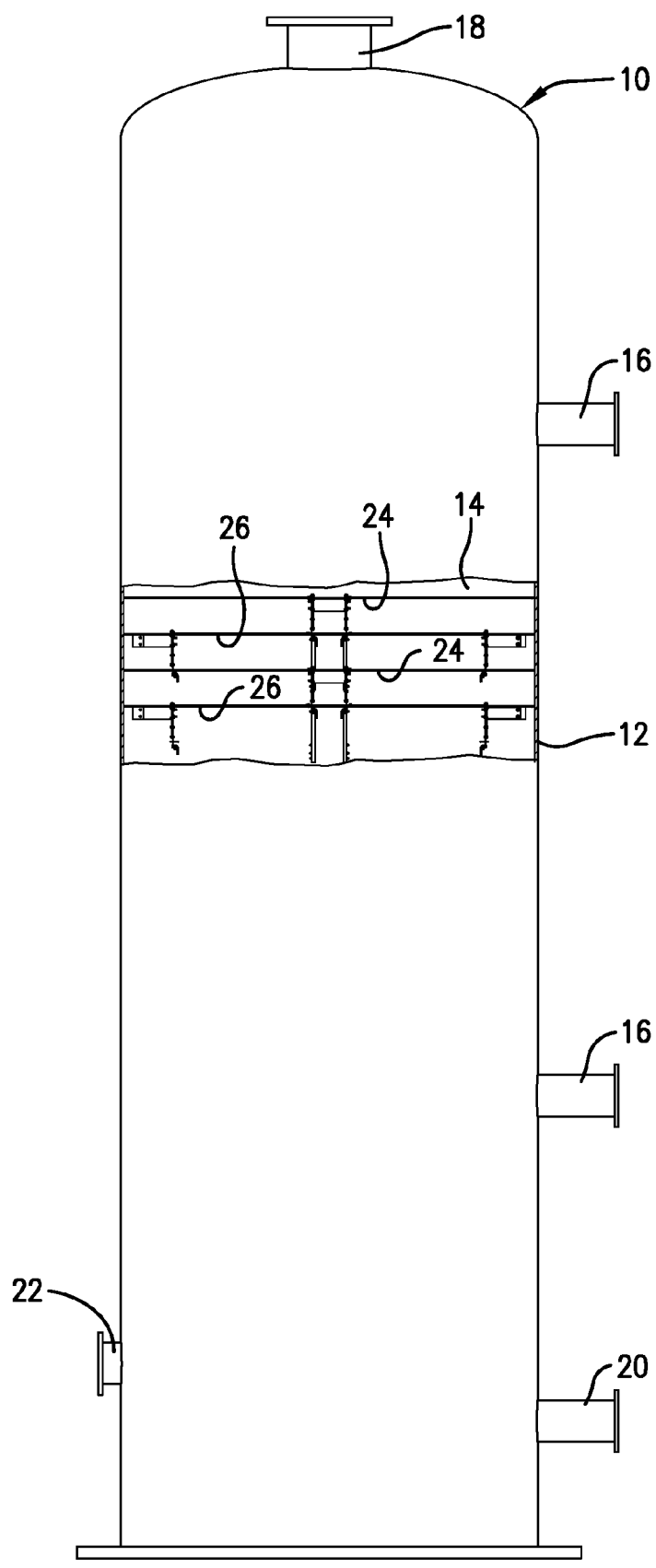
FIG. 1 is a side elevation view of a mass transfer column in which mass and/or heat transfer are intended to occur and in which a portion of the column shell is broken away to show the cross flow trays of the present invention.

Turning now to the drawings in greater detail and initially to FIG. 1, a mass transfer column suitable for use in processes in which mass transfer and/or heat exchange is intended to occur between countercurrent-flowing fluid streams is represented generally by the numeral 10. Mass transfer column 10 includes an upright, external shell 12 that is generally cylindrical in configuration, although other orientations, such as horizontal, and configurations, including polygonal, are possible and are within the scope of the present invention. Shell 12 is of any suitable diameter and height and is constructed from one or more rigid materials that are desirably inert to, or are otherwise compatible with the fluids and conditions present during operation of the mass transfer column 10.

Mass transfer column 10 is of a type used for processing fluid streams, typically liquid and vapor streams, to obtain fractionation products and/or to otherwise cause mass transfer and/or heat exchange between the fluid streams. For example, mass transfer column 10 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other processes occur.

The shell 12 of the mass transfer column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the mass transfer column 10 through any number of feed lines 16 positioned at appropriate locations along the height of the mass transfer column 10. One or more vapor streams can also be generated within the mass transfer column 10 rather than being introduced into the mass transfer column 10 through the feed lines 16. The mass transfer column 10 will also typically include an overhead line 18 for removing a vapor product or byproduct and a bottom stream takeoff line 20 for removing a liquid product or byproduct from the mass transfer column 10. Other column components that are typically present, such as reflux stream lines, reboilers, condensers, vapor horns, and the like, are not illustrated in the drawings because they are conventional in nature and an illustration of these components is not believed to be necessary for an understanding of the present invention.

The mass transfer column 10 includes a manway 22 that provides a closeable opening of a preselected diameter through the shell 12 to allow persons to enter and exit the internal region 14 within the mass transfer column 10, such as for installation, inspection, and repair or replacement of internals positioned within the mass transfer column 10. The manway 22 also serves to allow component parts of the various column internals to be passed through the manway 22 during installation or removal of the internals. The manway 22 is shown positioned near the bottom of the mass transfer column 10 to allow persons to access the manway 22 without the use of ladders or scaffolds, but the manway 22 or multiple manways 22 can be positioned at other locations.

Figure 2:
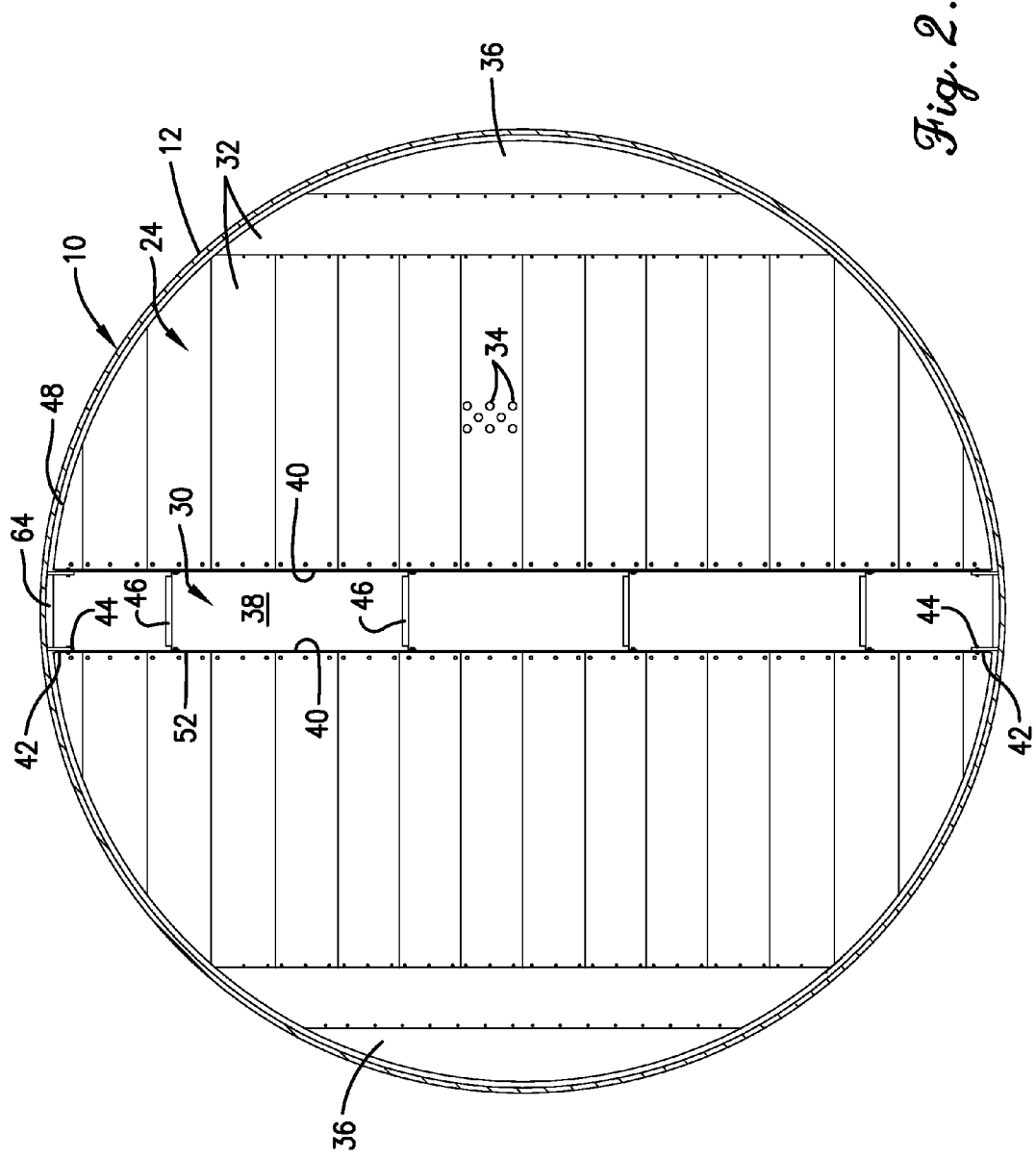
FIG. 2 is a top plan view of one of the cross flow trays shown in FIG. 1.

Turning additionally to FIGS. 2-7, any desired number of pairs of an upper cross flow tray 24 and a lower cross flow tray 26 constructed according to the present invention are positioned within the open internal region 14 of the mass transfer column 10 in vertically-spaced apart relationship with respect to each other. Each of the upper cross flow trays 24 comprises a generally planar tray deck 28 and a center downcomer 30 that receives the liquid stream flowing across the tray deck 28 and delivers it to the underlying lower cross flow tray 26. The tray deck 28 is formed from interconnected individual panels 32 that are each sized for passage through the manway 22. Most of the tray deck 28 includes apertures 34 (FIG. 2) to allow an ascending vapor, gas or liquid stream to pass through the tray deck 28 for interaction with a liquid stream traveling along an upper surface of the tray deck 28. In the accompanying drawings, only a few of the apertures 34 are illustrated in FIG. 2, but it is to be understood that the apertures 34 will normally be distributed across all surfaces of the tray decks 28 in each of the upper and lower cross flow tray 24 and 26, except for the inlet panels described below.

Figure 5:
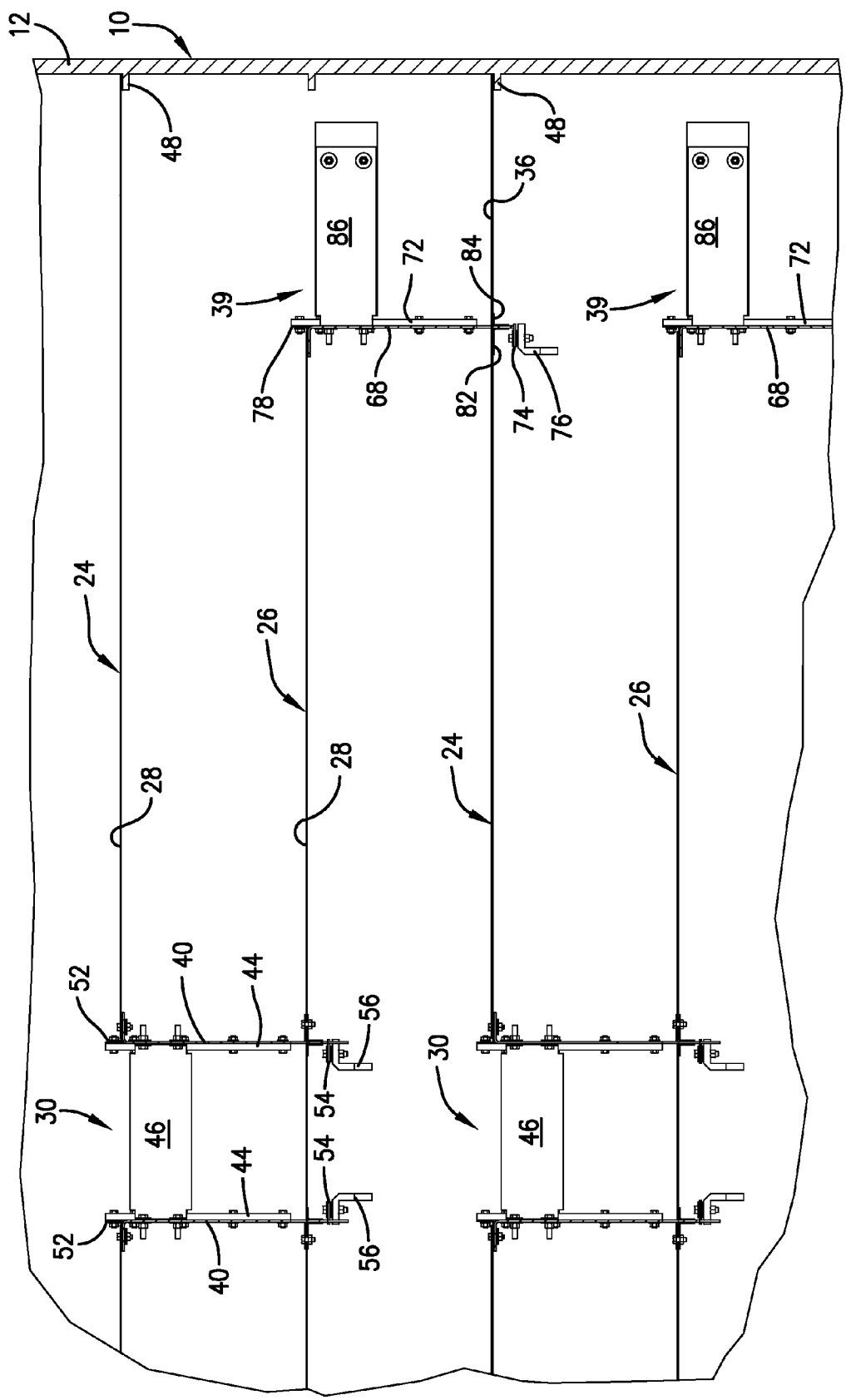
FIG. 5 is a fragmentary side elevation view of a series of the cross flow trays taken in vertical section.
Figure 15:
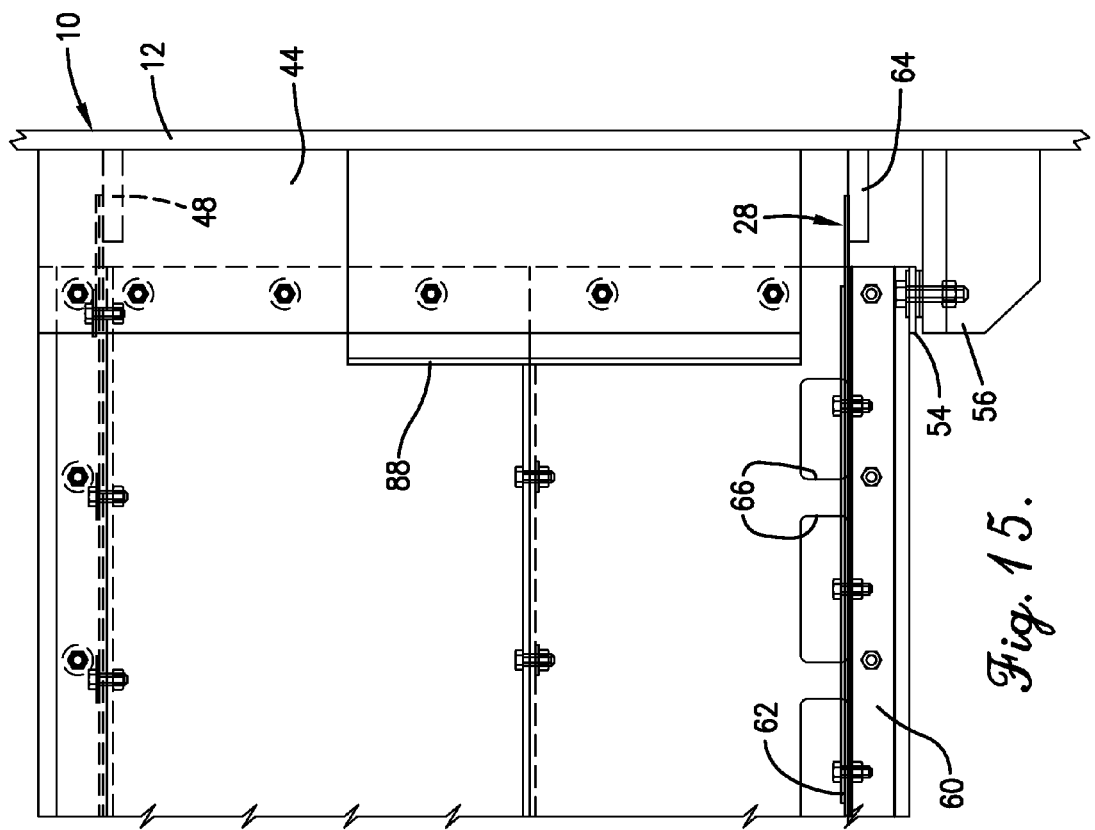
FIG. 15 is a fragmentary front elevation view of the pair of cross flow trays from FIG. 14, but rotated 90 degrees from the view shown in FIG. 14.
Figure 14:
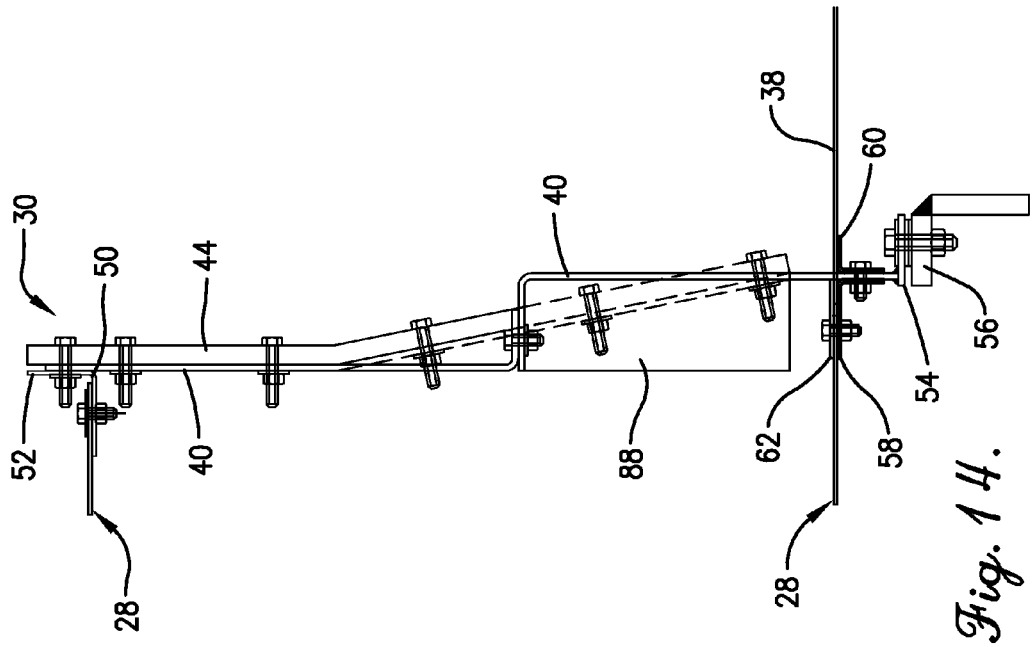
FIG. 14 is a fragmentary side elevation view similar to the view shown in FIG. 6, but showing a fifth embodiment of the downcomer wall.
Figure 17:
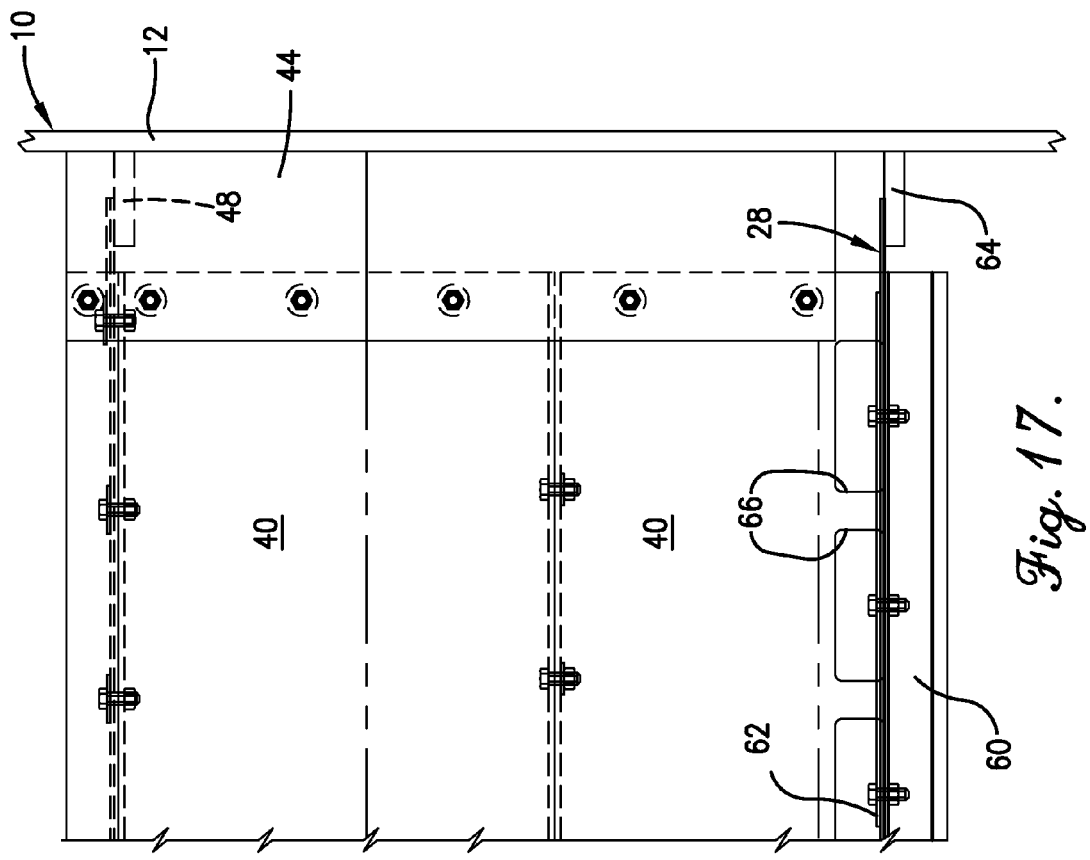
FIG. 17 is a fragmentary front elevation view of the pair of cross flow trays from FIG. 16, but rotated 90 degrees from the view shown in FIG. 16.
Figure 16:
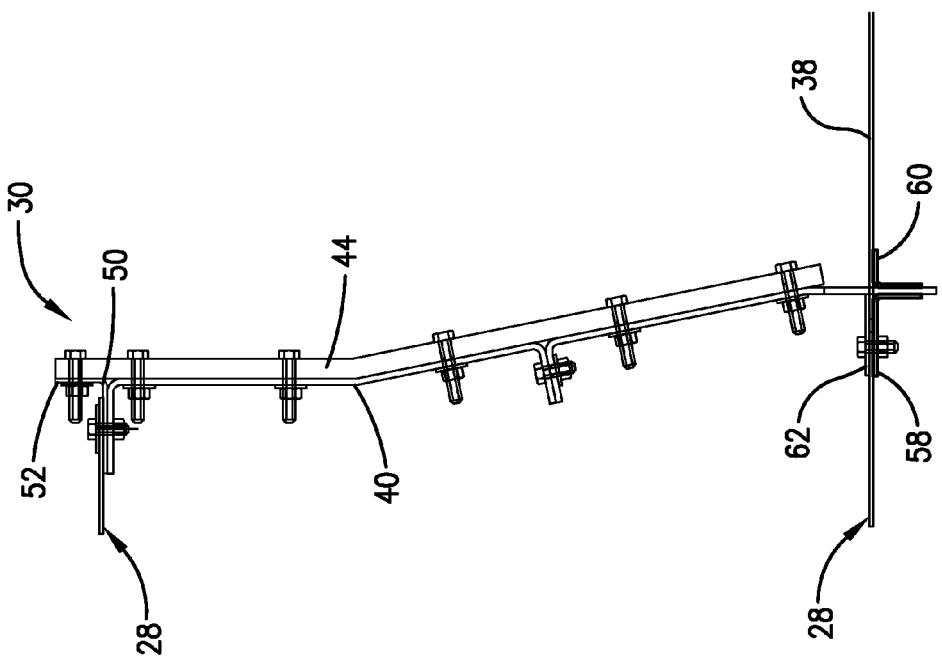
FIG. 16 is a fragmentary side elevation view similar to the view shown in FIG. 6, but showing a sixth embodiment of the downcomer wall.

The apertures 34 can be in the form of simple sieve holes or directional louvers or they may include structures such as fixed or movable valves. The portion of the tray deck 28 containing the apertures 34 is known as the active area of the upper cross flow tray 24. Both end portions of the tray deck 28 are normally imperforate and function as an inlet panel 36 to receive the liquid flowing downwardly within the side downcomers on the overlying lower cross flow tray 26 (FIG. 5). The end portions of the tray deck 28 may include bubble promoters or other structures to allow the ascending fluid stream to pass upwardly through the end portions of the tray deck 30.

The underlying lower cross flow tray 26 likewise comprises a tray deck 28 formed from interconnected individual panels 32 and containing apertures 34 of the type described above. A center portion of the tray deck 28 of the lower cross flow tray 26 is imperforate and functions as an inlet panel 38 for receiving liquid after it flows downwardly through the center downcomer 30 of the overlying upper cross flow tray 24. Side downcomers 39 are positioned at opposite ends of the tray deck 28 to receive the liquid stream flowing along the tray deck 28 and then deliver it to the upper cross flow tray 24 in the next underlying pair of cross flow trays 24 and 26.

The center downcomer 30 in each upper cross flow tray 24 comprises a pair of spaced apart, parallel walls 40 that extend in a chordal fashion across the open internal region 14 within the mass transfer column 10. Opposite ends 42 of each wall 40 are bolted to bolting bars 44 that are welded to the internal surface of the shell 12, as is best shown in FIG. 7. A number of spaced apart braces 46 extend perpendicularly between and are bolted to the walls 40 of the center downcomer 30 to stiffen and maintain the desired spacing between the walls 40.

As is best shown in FIGS. 6 and 7, the tray deck 28 of the upper cross flow tray 24 is supported along its perimeter on a circumferentially extending support ring 48 welded to the interior surface of the shell 12. The chordal edges of the hemispheric portions of the tray deck 28 on either side of the center downcomer 30 are also supported along each wall 40 of the center downcomer 30 by bolting an edge portion of the tray deck 28 to a horizontal leg of a support angle 50 that is in turn bolted along a top margin of the wall 40 of the center downcomer 30. The support angle 50 extends longitudinally from one end of the wall 40 to the opposite end. Other types of fasteners may be used in place of or in addition to the support angle 50 to join the edge of the tray deck 28 to the wall 40. A vertical leg of the support angle 50 functions as an outlet weir 52 to cause the liquid stream or froth on the tray deck 28 to accumulate to a preselected depth before spilling over the outlet weir 52 and entering the center downcomer 30.

In accordance with the present invention, the walls 40 of the center downcomer 30 extend downwardly below the plane of the tray deck 28 of the underlying lower cross flow tray 26 and function to interconnect and increase the rigidity of the paired upper cross flow tray 24 and lower cross flow tray 26.

A lower edge of each wall 40 is supported at both ends of the wall 40 by a foot 54 welded to the lower edge of the wall 40 and bolted to a footrest 56 that is in turn welded to the interior surface of the shell 12. A pair of support angles 58 and 60 extends along opposite sides of each wall 40, with each support angle 58 and 60 being bolted to a lower margin of each wall 40 to present horizontal legs that extend outwardly from the wall 40 in opposite directions to underlie and support the tray deck 28 of the cross flow tray 26. The support angles 58 and 60 extend longitudinally from one end of the wall 40 to the opposite end. A chordal edge portion of the active area of the tray deck 28 is sandwiched between and bolted to a batten plate 62 and the horizontal leg of the support angle 58. The chordal edge of the inlet panel 38 of the tray deck 28 may be secured in a similar fashion or it may simply rest on the horizontal leg of the other support angle 60. Other types of fasteners may be used in place of or in addition to the support angles 58 and 60 and batten plates 62 to join the edge of the tray deck 28 and/or inlet panel 38 to the wall 40. A perimeter of the tray deck 28 is supported on a circumferential support ring 64 positioned at an elevation above the footrests 56 and welded to the interior surface of the shell 12.

The walls 40 of the center downcomer 30 include a series of horizontally elongated discharge openings 66 positioned along the horizontal length of the walls 40 at the location of the tray panel 28 of the underlying cross flow tray 26 to allow liquid to exit the center downcomer 30 after descending onto the inlet panel 38. A lower edge of each of the discharge openings 66 is positioned in the plane of the tray deck 28 and an upper edge of each of the discharge openings 66 is spaced above the lower edge a preselected distance to establish the downcomer clearance. The open area presented by the discharge openings 66 is designed to permit the desired volumetric flow of liquid to exit the center downcomer while impeding the vapor or liquid ascending through the apertures 34 in the active area of the tray deck 28 from entering the center downcomer 30 through the discharge openings 66. The open area presented by the discharge openings 66 in one of the walls 40 may be the same as the open area presented by the discharge openings 66 in the other one of the walls 40 in the center downcomer 30 so that the amount of liquid discharged through the discharge openings 66 in one of the walls 40 is roughly equal to that discharged through the discharge openings 66 in the other one of the walls. Alternatively, the open area presented by the discharge openings 66 in one of the walls 40 may be different than the open area presented by the discharge openings 66 in the other one of the walls 40 so that different amounts of liquid are discharged through the discharge openings 66 in one wall 40 than in the other wall 40.

Extending the walls 40 of the center downcomer 30 of the upper cross flow tray 24 downwardly below the tray deck 28 of the underlying lower cross flow tray 26 allows the lower margin of each wall 40 to be interconnected with the tray deck 28 along all or substantially all of the length of each wall 40 and along the chordal length of the tray deck 28, rather than only at discrete positions along such length as is achieved by conventional methods. The walls 40 of the center downcomer 30 of the upper cross flow tray 24 thus provide a more rigid and secure method for supporting the tray deck 28 of the lower cross flow tray 26 and allow greater distances to be spanned in the design of larger diameter mass transfer columns 10, as well as reduced downcomer wall thickness to be used for a given diameter mass transfer column 10. In addition, the fabrication costs and installation time for the support system of the present invention are significantly reduced in comparison to present methods in which major beams, lattice trusses or a system of hangers are used to provide added support to the tray deck 28.

Figure 4:
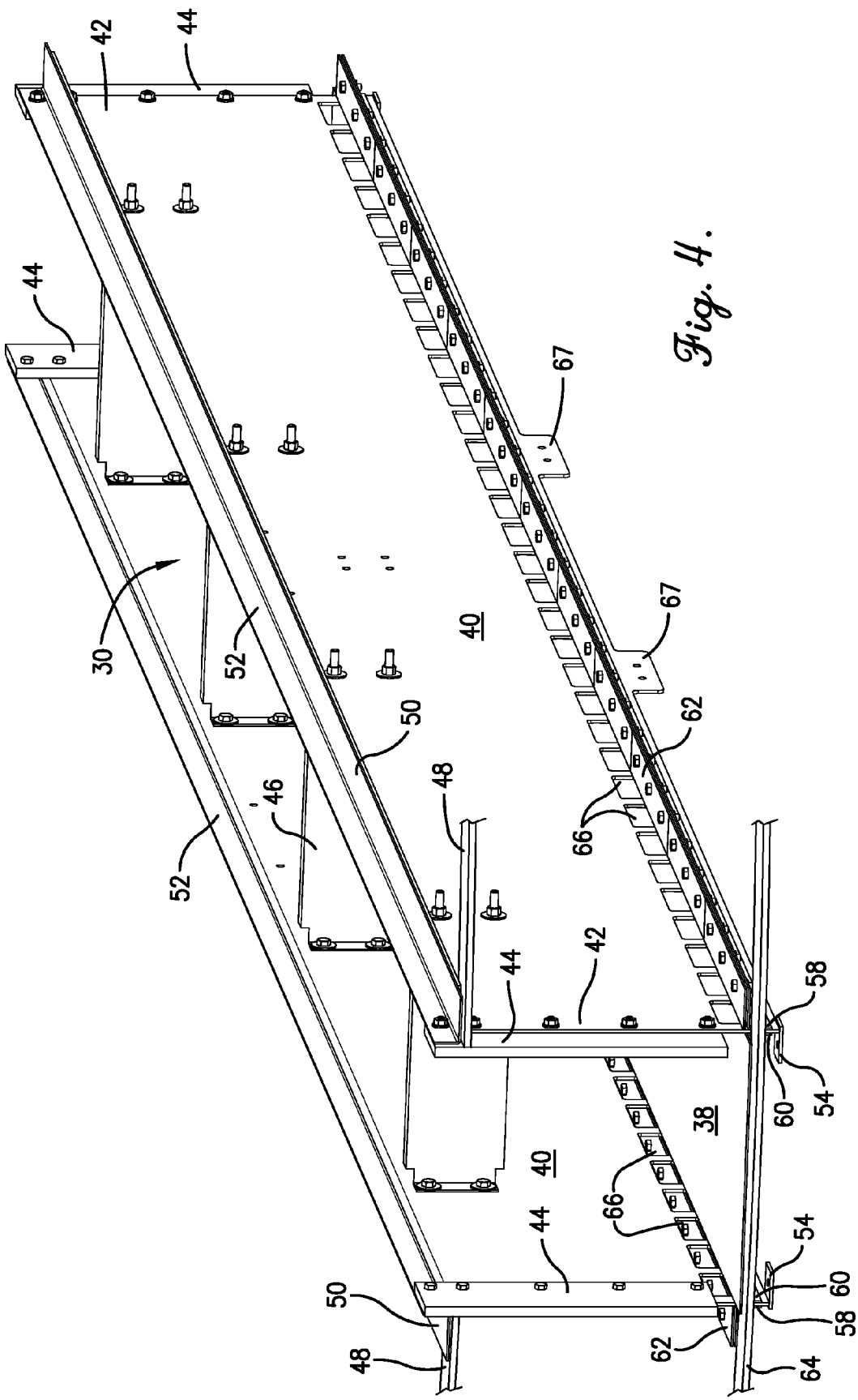
FIG. 4 is a top perspective view of the downcomer wall system that is used to support the tray deck of the lower cross flow tray.

The lower portions of the walls 40 of the center downcomer 30 positioned below the supported tray deck 28 of the lower cross flow tray 26 can also be used as anchors for braces (not shown) that extend downwardly to tie one pair of upper and lower cross flow trays 24 and 26 to an underlying pair of upper and lower cross flow trays 24 and 26 to provide even greater strength and rigidity. As can be seen in FIG. 4, ears 67 that extend downwardly from a lower edge of the walls 40 may be used as attachment points for one end of the braces. The other end of the braces may be attached to the support angle 50 in the upper cross flow tray 24 in the underlying pair of upper and lower cross flow trays 24 and 26.

Although the use of the spaced apart walls 40 to support the underlying tray deck 28 has been described with respect to center downcomer 30 in the illustrated two-pass configuration, it is to be understood that the walls of off-center downcomers may be constructed in this same fashion in four-pass and other multiple-pass configurations. This is contemplated by and is within the scope of the present invention.

Figure 3:
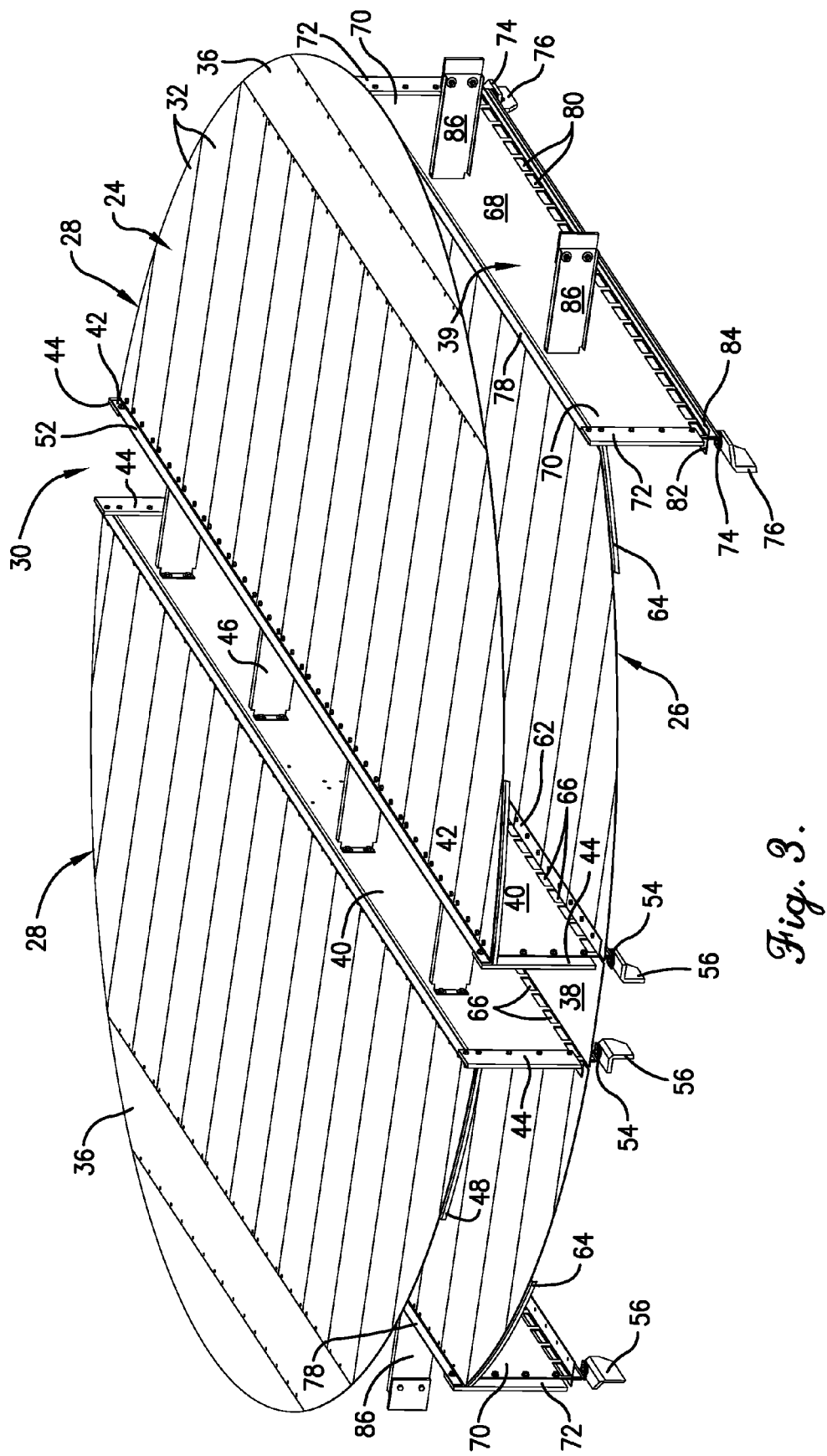
FIG. 3 is a top perspective view of a pair of cross flow trays of FIG. 1 showing the downcomer walls of the upper tray extending below and supporting the tray deck of the lower cross flow tray.

Similarly, as can be seen in FIGS. 3 and 5, the side downcomers 39 on the opposite ends of the lower cross flow tray 26 may be constructed using a wall 68 constructed in the same manner as the walls 40 of the center downcomer 30 described above. Opposite ends 70 (FIG. 3) of the wall 68 are bolted to bolting bars 72 that are welded to the interior surface of the shell 12 (not shown) and a foot 74 is used to support a lower edge of the wall 68 on a footrest 76 welded to the shell 12. A support angle 78 extends along a top edge of the wall 68 and has a horizontal leg that supports the chordal edge of the tray deck 28 of the lower cross flow tray 26 and a vertical leg that extends upward above the plane of the tray deck 28 to form an outlet weir for the side downcomer 39. Discharge openings 80 are positioned along a lower margin of the wall 68 at and extending above the elevation of the underlying tray deck 28. Support angles 82 and 84 are bolted along the lower margin of the wall 68 and present horizontal legs to support a chordal edge of the tray deck 28 and a chordal edge of the inlet panel 36 of an underlying upper cross flow tray 24. One or more braces 86 are bolted at one end to the wall 68 and are welded at the opposite end to an interior surface of the shell 12 to stabilize the wall 68. The support angles 78, 82, and 84 extend longitudinally from one end of the wall 68 to the opposite end. Other types of fasteners may be used in place of or in addition to the support angles 78, 82, and 84 to join the edge of the tray deck 28 and/or the inlet panel 36 to the wall 68.

By interconnecting the lower margin of the wall 68 of the side downcomer 39 of the lower cross flow tray 26 to the tray deck 28 and inlet panel 36 of the underlying upper cross flow tray 24 along all or substantially all of their chordal lengths, the wall 68 of the side downcomer 39 of the lower cross flow tray 26 functions in the same manner as the walls 40 of the center downcomer 30 of the upper cross flow tray 24 by utilizing the strength of the wall 68 to provide greater support to the underlying upper cross flow tray 24. The lower portions of the walls 68 positioned below the supported tray deck 28 can also be used as anchors for braces (not shown) that extend downwardly to tie one pair of upper and lower cross flow trays 24 and 26 to an underlying pair of upper and lower cross flow trays 24 and 26 to provide even greater strength and rigidity.

In the embodiments illustrated in FIGS. 8-19, the wall 40 of the center downcomer 30 is formed in a two-piece construction to allow passage of the individual components through the manway 22 in the shell 12 of the mass transfer column 10. An upper portion of the wall 40 extends vertically and a lower portion of the wall 40 also extends vertically but is offset from the upper portion by a dogleg so that a lower portion of the center downcomer 30 or the side downcomer 39 has a reduced horizontal cross section in comparison to the top portion. An end plate 88 is also used in the embodiments shown in FIGS. 8-16 to seal the opposite ends 42 of the wall 40 against the inclined bolting bars 44. In the embodiments shown in FIGS. 16-19, the optional foot 54 and footrest 56 are removed. In the embodiments shown in FIGS. 20-25, stiffeners 90 are secured to the wall 40 to further strengthen the wall 40 against deflection.

The present invention includes a method of supporting the tray decks 28 of the upper and lower cross flow trays 24 and 26 in the mass transfer column 10. The method includes the steps of pairing or coupling the upper and lower cross flow trays 24 and 26 by extending the walls 40 of the center downcomer 30 and the walls 68 of the side downcomers 39 below the underlying tray deck 28 and then supporting the tray deck 28 in part by securing the lower margin of the walls 40 and 68 to the tray deck 28 along all or substantially all of the chordal length of the walls 40 and 68 and the tray deck 28. The tray deck 28 from which liquid is fed into the center downcomer 30 or the side downcomer 39 is supported in part by securing the upper margin of the walls 40 and 68 to the tray deck 28 along all or substantially all of the chordal length of the walls 40 and 68 and the tray deck 28.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An upper cross flow tray paired with a lower cross flow tray for facilitating interaction between fluid streams in a mass transfer column, said upper and lower cross flow trays each having a tray deck with apertures and a downcomer, at least one of said downcomers comprising a wall extending downwardly from a tray deck of one of said upper and lower cross flow trays to below the tray deck of the other one of said upper and lower cross flow trays, wherein said wall is connected to and provides structural support for both of said tray decks.

2. The paired upper cross flow tray and lower cross flow tray of claim 1, wherein said at least one of said downcomers is a center or off-center downcomer extending downwardly from said upper cross flow tray and comprising two of said walls positioned in spaced apart and parallel-extending relationship.

3. The paired upper cross flow tray and lower cross flow tray of claim 1, wherein said at least one of said downcomers is a side downcomer extending downwardly from said lower cross flow tray.

4. The paired upper cross flow tray and lower cross flow tray of claim 1, including discharge openings positioned in said wall of the downcomer at a location to permit liquid to pass through said discharge openings and onto said tray deck of the other one of said upper and lower cross flow trays.

5. The paired upper cross flow tray and lower cross flow tray of claim 1, including an inlet panel positioned to close the bottom of said at least one of said downcomers and supported by said wall.

6. The paired upper cross flow tray and lower cross flow tray of claim 1, wherein the wall of the downcomer extends vertically between said tray decks.

7. The paired upper cross flow tray and lower cross flow tray of claim 1, wherein the wall of the downcomer includes an upper portion that extends vertically and a lower portion that also extends vertically and is offset from the upper portion by a dogleg so that a lower portion of the downcomer has a reduced horizontal cross section in comparison to the top portion.

8. A mass transfer column comprising a shell and an open internal region in which a plurality of pairs of horizontally-extending upper cross flow trays and lower cross flow trays are positioned in vertically spaced-apart relationship, said upper and lower cross flow trays each having a tray deck with apertures and a downcomer, at least one of said downcomers comprising a chordal wall extending downwardly from a tray deck of one of said upper and lower cross flow trays to below the tray deck of an underlying one of said upper and lower cross flow trays and discharge openings positioned in said wall at a location to permit liquid to pass through said discharge openings and onto said tray deck of the underlying one of said upper and lower cross flow trays, wherein said wall is connected to and provides structural support for said tray deck of said one of said upper and lower cross flow trays and said tray deck of said underlying one of said upper and lower cross flow trays.

9. The mass transfer column of claim 8, wherein said at least one of said downcomers is a center or off-center downcomer extending downwardly from one of said upper cross flow trays and comprising two of said walls positioned in spaced apart and parallel-extending relationship.

10. The mass transfer column of claim 8, wherein said at least one of said downcomers is a side downcomer extending downwardly from said lower cross flow tray and having said wall.

11. The mass transfer column of claim 8, including a support ring secured to an inner surface of said shell and supporting a perimeter of said tray deck of said one of said upper and lower cross flow trays.

12. The mass transfer column of claim 11, including bolting bars secured to said inner surface of said shell and joined to opposite ends of said wall.

13. The mass transfer column of claim 12, including an inlet panel positioned to close the bottom of said at least one of said downcomers and supported by said wall.

14. The mass transfer column of claim 13, wherein the wall of the downcomer extends vertically between said tray decks.

15. The mass transfer column of claim 13, wherein the wall of the downcomer includes an upper portion that extends vertically and a lower portion that also extends vertically and is offset from the upper portion by a dogleg so that a lower portion of the downcomer has a reduced horizontal cross section in comparison to the top portion.

16. The mass transfer column of claim 8, wherein said downcomers include a center downcomer on each of said upper cross flow trays and side downcomers positioned at opposite ends of each of said lower cross flow trays and wherein said center downcomer comprises two of said walls in spaced-apart and parallel-extending relationship and each of said side downcomers comprises one of said walls.

17. The mass transfer column of claim 16, wherein each of said center downcomers and said side downcomers includes an inlet panel positioned to close the bottom of the associated center downcomer or side downcomer.

18. The mass transfer column of claim 17, wherein in each of said center downcomers the inlet panel is supported by the walls of the associated center downcomer and in each of said side downcomers the inlet panel is supported by the wall of the associate side downcomer.

19. A method of supporting tray decks of cross flow trays in a mass transfer column using a downcomer positioned on one of said cross flow trays and having a chordal wall that extends downwardly from said one of said cross flow trays to below an underlying one of said cross flow trays, said method comprising the steps of securing an upper margin of the wall to the tray deck of said one of said cross flow trays along all or substantially all of the chordal length of the wall and securing a lower margin of the wall to the tray deck of an underlying one of said cross flow trays along all or substantially all of the chordal length of the wall.

20. The method of claim 19, including the steps of supporting a perimeter portion of the tray decks on circumferential support rings secured to an inner surface of a shell of said mass transfer column and supporting opposite ends of said wall of the downcomer on bolting bars fixed to said inner surface of said shell.

* * * * *